United States Patent
Aye et al.

(10) Patent No.: US 6,563,612 B1
(45) Date of Patent: May 13, 2003

(54) COLLIMATING SCREEN SIMULATOR AND METHOD

(75) Inventors: Tin M. Aye, Mission Viejo, CA (US); Kevin H. Yu, Temple City, CA (US); Gajendra D. Savant, Rancho Palos Verdes, CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/664,157

(22) Filed: Sep. 18, 2000

Related U.S. Application Data

(63) Continuation-in-part of application No. 09/633,725, filed on Aug. 7, 2000.
(51) Int. Cl.[7] ................................................. G02B 5/32
(52) U.S. Cl. ........................... 359/15; 359/460; 359/641
(58) Field of Search ............................. 359/15, 16, 449, 359/454–457, 460, 641

(56) References Cited

U.S. PATENT DOCUMENTS

| | | | |
|---|---|---|---|
| 4,586,780 A | * | 5/1986 | Chern et al. ................... 359/34 |
| 4,960,314 A | * | 10/1990 | Smith et al. ................... 359/15 |
| 5,886,675 A | | 3/1999 | Aye et al. ....................... 345/7 |
| 6,095,652 A | * | 8/2000 | Trayner et al. ................ 359/15 |

* cited by examiner

*Primary Examiner*—Mark A. Robinson
*Assistant Examiner*—Alessandro V. Amari
(74) *Attorney, Agent, or Firm*—Leonard Tachner

(57) ABSTRACT

A collimating screen simulator comprising a projector and a holographic diffuser screen. The projector is adapted to project a viewable image onto a focal plane that is spaced from the projector. The focal plane has a backside and a viewing side opposite the focal plane backside. In operation, the projector is able to project the image onto the focal plane backside. The holographic diffuser screen is adapted to permit light from a source and incident upon a surface of the diffuser screen to pass through the screen. The holographic diffuser screen has a first surface facing the focal plane viewing side for receiving the incident light. The holographic diffuser screen also has a second surface opposite the first surface. The holographic diffuser screen is spaced from the focal plane viewing side by a distance effective for enabling a viewer facing the second surface of the holographic diffuser screen to see collimated light exiting the holographic screen.

13 Claims, 4 Drawing Sheets

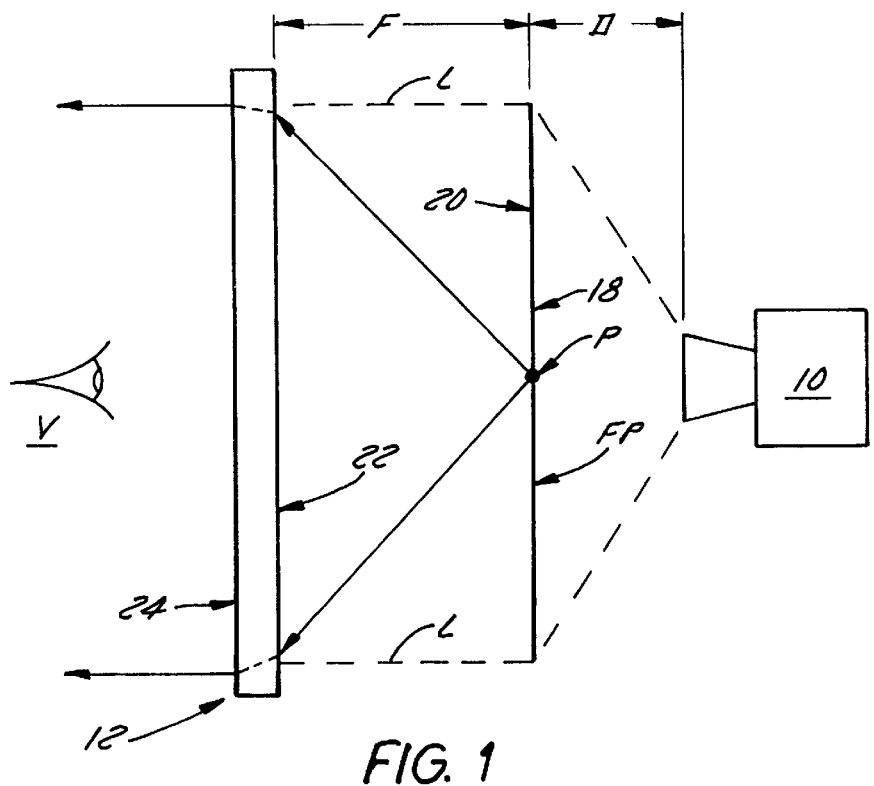
FIG. 1
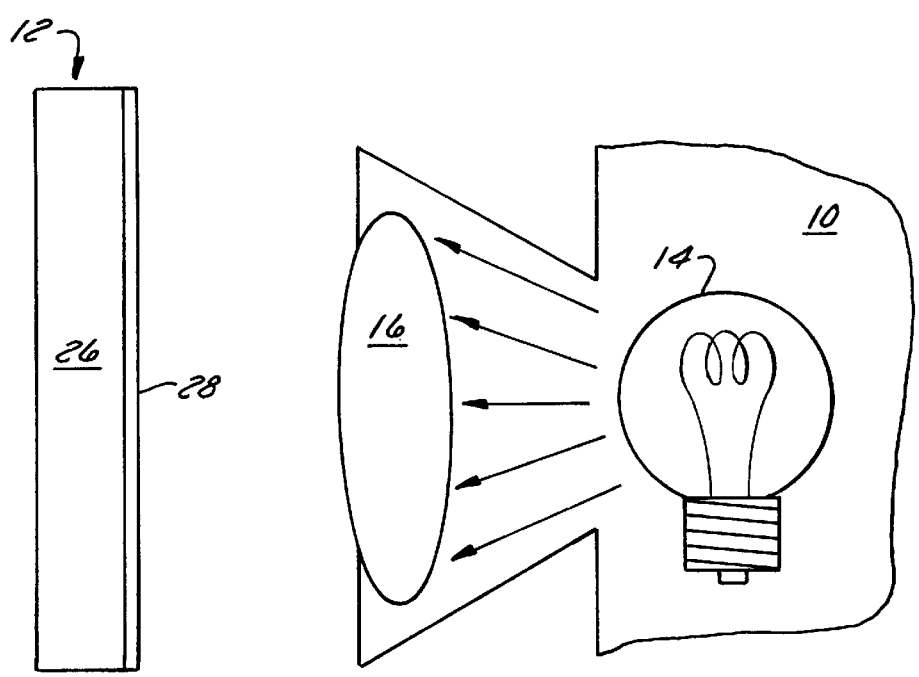
FIG. 3
FIG. 2

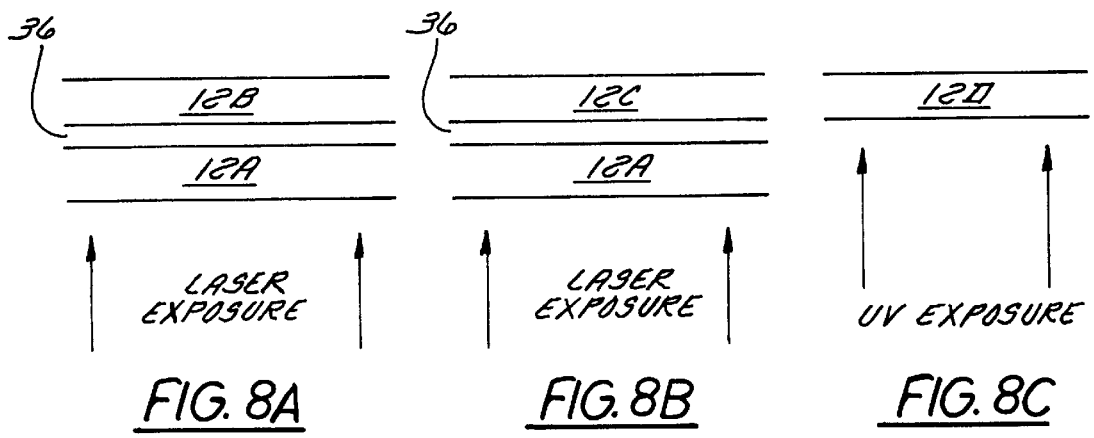
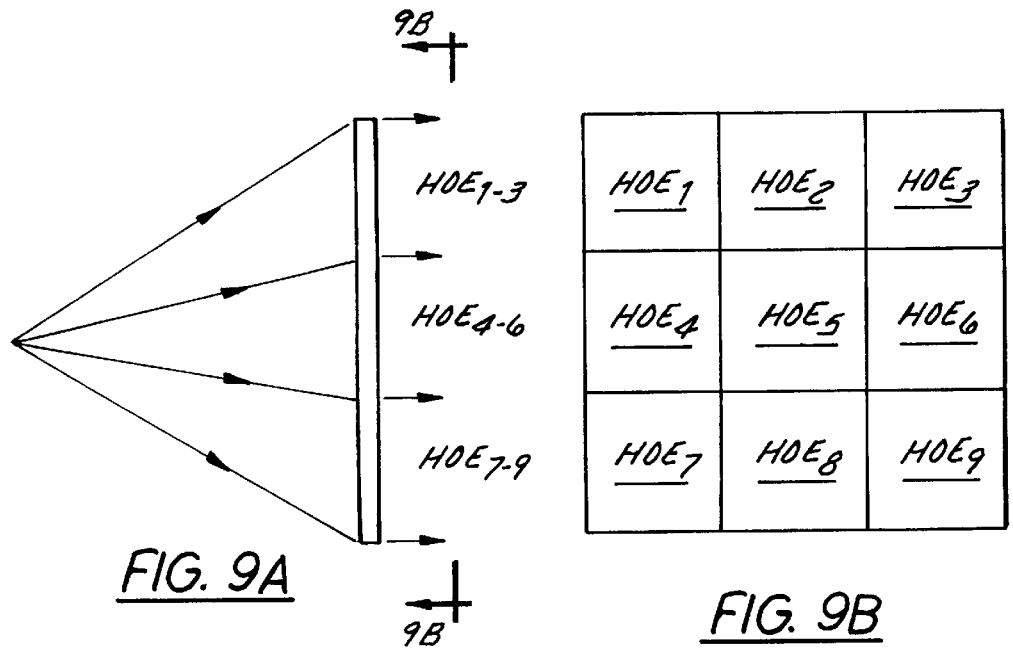

COLLIMATING SCREEN SIMULATOR AND METHOD

REFERENCE TO RELATED APPLICATION

This application is a continuation-in-part (CIP) of U.S. Ser. No. 09/633,725 (Reference No. 100.202) filed Aug. 7, 2000, the benefit of which is now claimed for purposes of priority pursuant to 35 USC §120.

FIELD OF THE INVENTION

The present invention, in general, is directed to the field of collimator devices.

Further in reference to the field, the present invention is directed to a collimating screen simulator which is used in connection with a projector which is preferably located behind the simulator in relation to a viewer.

Still more particularly, the present invention is also directed to a method for using the collimating screen simulator, which is disclosed in detail herein, for simulation of an object and, thereafter, for displaying the object at an infinitely distant position.

BACKGROUND OF THE INVENTION

In principle, a "perfect" collimator is a device for producing a beam of precisely parallel rays (as of light) or for forming an infinitely distant virtual image which can be viewed without parallax. Furthermore, in the field of the invention, the term "parallax" is well understood by those skilled artisans of the field to mean the apparent displacement, or the difference in apparent direction, of an object as seen from two different points which are not on a straight line with the object.

Historically, the manufacturers of collimator devices have relied upon lenses of various shapes and surface curvatures, including combinations of such lenses, to achieve a desired effect. As a result, conventional collimator devices frequently have been bulky and/or may have possessed significant weight, with specialty plastics currently replacing glass to obtain a desired advantage. Yet, current technology is economically impractical for large-scale applications that require an unbroken collimating effect over a large area. It is therefore currently desirable to further reduce the volume and mass of collimators.

Moreover, conventional collimator devices are not perfect with the result that an image which is projected onto a screen appears to come from the screen. In other words, since the projected image appears on the movie screen, the viewer focuses his/her eyes on the screen. Amazingly, this is viewed as a "problem" by those in the entertainment field, where every attempt is made to take the theater-goer out of the "environment" of the theater and place him/her into the "environment" of the entertainment being viewed.

In the entertainment field, to simulate virtual "reality" for theater-goers, it would therefore be desirable to create a virtual "window" onto which an image is projected, so the projected image appears to come from a quasi-infinite distance behind the "window," meaning that the screen is no longer noticed by the viewer. Rather, the viewer focuses on objects that may appear to be just behind, or extremely far behind, the invisible window.

Thus, even more practical virtual "reality" applications for the present invention involve the fields of simulators for training pilots, navigators and other aircraft personnel.

There are, however, significantly broader applications for the present invention, which utilize principles of virtual "reality" in, e.g., the technical areas of medical training, outer space and under-the-sea simulation, an assortment of fantasy-based devices as well as other general amusement-based devices including video arcade and gaming devices.

Furthermore, holographic displays can be reconstructed from a collimated beam, as noted in U.S. Pat. No. 5,886,675 to Aye et al., assigned to Physical Optics Corporation. On the other hand, and to the best of our combined knowledge prior to our present discovery, we had never read or heard of anyone using a holographic screen to produce a collimated beam, which is the essence of our present discovery. In other words, in view of recent advances in technology relating to ever sleeker, trimmer and lighter holographic screens, where much of the present state-of-the-art technology results from our efforts at Physical Optics Corporation, it struck us that a holographic screen may have a heretofore unappreciated utility, especially in connection with the production of collimated beams, in view of the present desire to achieve an unbroken collimating effect over a large area.

SUMMARY OF THE INVENTION

The present invention may be summarized as a collimating screen simulator comprising a projector and a holographic diffuser screen. The projector is adapted to project a viewable image onto a focal plane that is spaced from the projector.

The focal plane has a backside and a viewing side opposite the focal plane backside. In operation, the projector projects the image onto the focal plane backside. The holographic diffuser screen is adapted to permit light from a source and incident upon a surface of the diffuser screen to pass through the screen. The holographic diffuser screen has a first surface facing the focal plane viewing side for receiving the incident light and a second surface opposite the first surface. The holographic diffuser screen is spaced from the focal plane viewing side by a distance effective for enabling a viewer facing the second surface of the holographic diffuser screen to see collimated light exiting the holographic screen. In reference to the collimating screen simulator, the holographic diffuser screen preferably includes at least a substrate and a film hologram applied to the substrate. Further in this regard, the substrate is preferably either plastic or glass. Still further in this regard, if the substrate is of plastic, such plastic is preferably polycarbonate.

Still referring to the collimating screen simulator, the substrate is preferably about 1 millimeter to about 6 millimeters thick, more preferably about 2 millimeters to about 5 millimeters thick, and still more preferably about 3 millimeters to about 4 millimeters thick. Furthermore, the film hologram preferably has a thickness that ranges from about 5 microns to about 50 microns. More preferably, the film hologram has a thickness that ranges from about 10 microns to about 40 microns, and still more preferably that ranges from about 15 microns to about 35 microns.

In reference to conventional viewing simulators, the projected image appears on the viewing screen, and the viewer focuses his/her eyes on the screen.

In reference to the invention, however, the viewer (not aware of the screen) is in fact focusing his/her eyes at "infinity" which those skilled in the field of the invention know as "optical" infinity (understood to be a distance of about 300 feet from the viewer) which differs from the mathematically-precise "infinity" as defined by optical principles.

A method for displaying an image at a distance defined hereinabove as "optical" infinity may be summarized as follows. Such a method comprises the step of interposing between a viewer and a projector spaced from the viewer the holographic diffuser screen.

These and other aspects and features of the invention will readily be apparent to those skilled in the art upon reference to the detailed description and following figures.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

FIG. 1 is a side elevational schematic view of the collimating screen simulator of the present invention.

FIG. 2 is a partially-fragmented detailed view of an element of the simulator depicted in FIG. 1 on an enlarged scale relative thereto.

FIG. 3 is a side elevational detailed view of another element of the simulator depicted in FIG. 1 on a dimensionally exaggerated scale relative thereto.

FIGS. 8A through 8C show a so-called "contact copy" feature of the invention.

FIG. 9A is a side elevational view of a so-called "mosaic master array" feature of the invention and FIG. 9B is a frontal view of the array, taken along the plane B—B.

Throughout the drawings, like reference numerals refer to like parts.

DETAILED DESCRIPTION OF PREFERRED EMBODIMENTS

Figure 4:
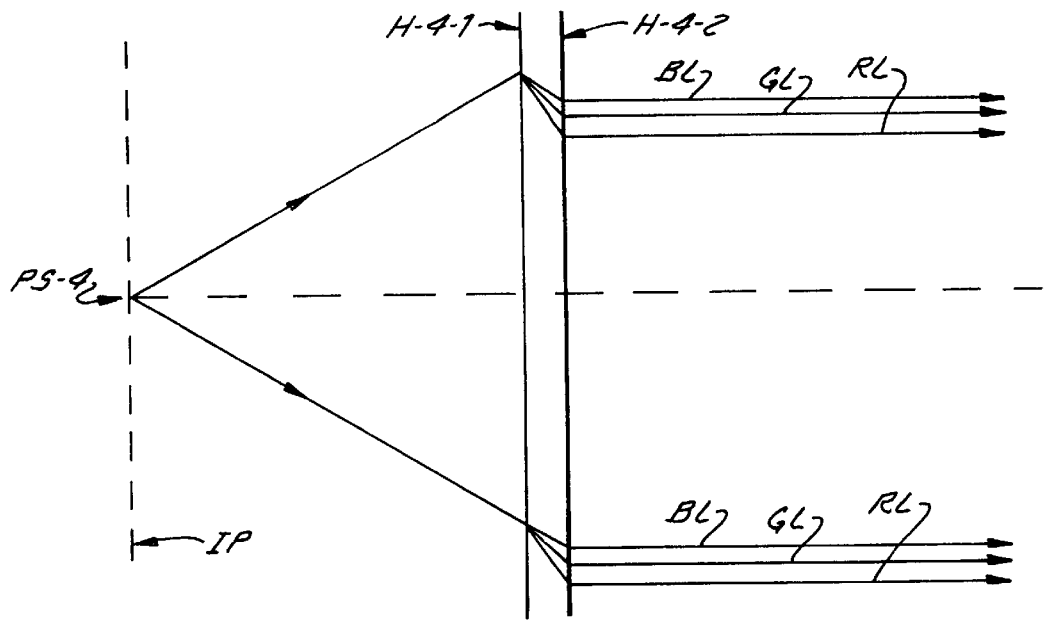
FIG. 4, which is illustrative of the prior art, is a side elevational schematic view depicting a pair of spaced-apart single conventional broadband holographic optical elements, for purposes of illustrating some problems experienced with state-of-the-art holographic optical element technology.

Referring to the figures, there is shown a collimating screen simulator (FIG. 1) that is characterized as including a conventional projector 10 and a holographic diffuser screen 12. The projector 10 preferably includes (see FIG. 2) a conventional source of incoherent light such as light bulb 14, a conventional optical element such as lens 16, and other well-known elements (not shown) that, together with the light bulb 14 and lens 16, enable the projector to project a viewable image onto a focal plane ("FP") spaced from the projector 10. It is important to bear in mind, at this juncture, that focal plane ("FP") is a "virtual" surface, not a tangible surface. As a result, the focal plane ("FP") which is shown on-edge in FIG. 1 consists entirely of point sources of light ("P") projected by the projector 10 onto that region of space which the focal plane ("FP") defines. It is also important to bear in mind, at this juncture, that the distance ("D") between the projector 10 and the focal plane ("FP") is defined by various components of the projector 10, such as the optical properties of the lens 16. As a result, the illustrated distance ("D") is not an essential aspect of the present invention. Further in that regard, those skilled in the field of the present invention are aware of methods, techniques and commercially-available equipment for varying the distance ("D"), as desired, for an assortment of purposes.

Bearing in mind that the following orientation is arbitrary, suffice it to note that the focal plane ("FP") defines a backside 18 as well as a viewing side 20 that is located opposite the backside 18. Also bear in mind that the projector 10 includes media such as film (not shown) on which images appear. As illustrated in FIG. 1, projector 10, when in operation, is adapted to project the images onto the backside 18 of focal plane ("FP").

Further bear in mind that mention of media such as film, above, is illustrative. Conventional projectors capable of projecting images stored on compact discs ("CDs"), and/or able to obtain images via optical cable, are within the scope of the invention.

Moreover, as those skilled in the art can well appreciate, the dashed lines ("L") between the focal plane ("FP") and the holographic diffuser screen 12 represent lines of virtual direction, from the reference point of the viewer ("V"), from where both the light as well as the associated images projected by the light appear to originate.

Accordingly, in operation, the holographic diffuser screen 12 collimates light rays emanating from the point source, as is illustrated by the focal plane ("FP") located behind the holographic diffuser screen 12 relative to the viewer ("V"). The result is that such light as well as the associated images projected by the light appear to the viewer ("V") to emanate from the distance known as "optical" infinity, relative to the viewer location.

The holographic diffuser screen 12 is adapted to permit light to pass through said diffuser screen 12. In that regard, the holographic diffuser screen 12 (FIG. 1) defines a first surface 22 facing the viewing side 20 of the focal plane ("FP") as well as a second surface 24 that is located opposite the first surface 22. The holographic diffuser screen 12 is spaced from the viewing side 20 of the focal plane ("FP") by a focal distance ("F") that is effective for enabling a viewer ("V") facing the second surface 24 of the holographic diffuser screen 12 to see collimated light emanating from the holographic screen 12.

In the collimating screen simulator of the present invention, essential elements of the holographic diffuser screen 12 are characterized herein as including at least one substrate 26 and at least one film hologram 28 applied to the substrate 26, such as is depicted in FIG. 3.

Further in this regard, the substrate 26 is preferably manufactured from a commercially-available light-transmissive relatively high optical-quality plastic or glass. Still further in this regard, the substrate 26, if made of plastic, is manufactured from commercially-available high-quality polycarbonate.

The substrate 26 is preferably between about 1 millimeter to about 6 millimeters thick, is more preferably between about 2 millimeters to about 5 millimeters thick, and is still more preferably between about 3 millimeters to about 4 millimeters thick.

Furthermore, the film hologram 28 preferably has a thickness that ranges from between about 5 microns to about 50 microns. The film hologram 28 more preferably has a thickness that ranges from about 10 microns to about 40 microns, and still more preferably that ranges from between about 15 microns to about 35 microns.

The above-noted thickness values are illustrative of "best mode" dimensional requirements. Actual thicknesses of substrate 26 as well as of film hologram 28 will, of course, depend upon the actual materials selected, as those skilled in the art well know.

For example, if the film hologram 28 is manufactured from one well-known commercially-available silver-based material, film thickness may range between about 10 to about 50 microns. Alternatively, if the film hologram 28 is manufactured to from another well-known commercially-available material known in the trade as Du Pont "DCG" product, the resultant thickness may range between about 25 to about 35 microns.

Best Mode

As used herein, the term holographic optical element ("HOE") will be understood, in general, as being a hologram, and more particularly a holographic film, that has been recorded in photosensitive medium such as photoresist using known well-defined object and reference beams, such as plane waves or spherical waves.

One notable difference between holographic and conventional recording is that a hologram contains phase information about objects in addition to amplitude information.

The recording of both phase and amplitude information is accomplished by using coherent light sources for both the object beam as well as the reference beam, to produce a complex interference diffraction pattern. Such a complex pattern can be recorded in a number of suitable photosensitive media, as a surface relief (i.e., a thin phase hologram), or to achieve index modulation of the thickness of the film (i.e., volume phase hologram).

If the resultant hologram is illuminated with a reference beam at the wavelength of the original beam, the object beam is re-created exactly by the diffraction pattern; but, if the recording and reconstruction geometry and wavelengths are different, the hologram will produce a longitudinal chromatic dispersion effect, meaning that distinct separate colors (e.g., red, green and blue) will separate out and become noticeable. Moreover, a geometrical aberration will be present and will vary with the re-construction wavelength.

FIG. 4 illustrates some of the problems which are experienced when utilizing a pair of spaced-apart conventional single broadband holographic optical elements. A first optically-transmissive conventional holographic optical element ("H-4-1") receives white light from a point source ("PS-4"), and transmits the light therethrough. An input image plane ("IP"), which is shown on-edge (in dashed line) in FIG. 4, defines the region from where a plurality of point sources ("PS-4") of white light originate. The input image plane ("IP") is shown spaced from (and to the left of) the first holographic optical element ("H-4-1").

A dispersion effect causes the transmitted light to be broken down chromatically into, e.g., separately colored rays of blue light ("BL"), green light ("GL") and red light ("RL"), all of which then exit the first holographic optical element ("H-4-1"). Such light is next transmitted to a second optically-transmissive conventional holographic optical element ("H-4-2"), which receives the dispersed light and transmits the dispersed light therethrough. The second holographic optical element ("H-4-2") is spaced from and to the right of the first holographic optical element ("H-4-1"). Such light, which then exits the second holographic optical element ("H-4-2"), remains dispersed and separated chromatically, which is an effect that was noted in the practice of the invention disclosed in U.S. Pat. No. 5,886,675.

A diverging object beam and a collimated reference beam are employed to record the first holographic optical element ("H-4-1"). To record the second holographic optical element ("H-4-2"), two collimated beams are employed, and one of the collimated beams is located where the reference had been, for the first holographic element ("H-4-1").

Figure 5:
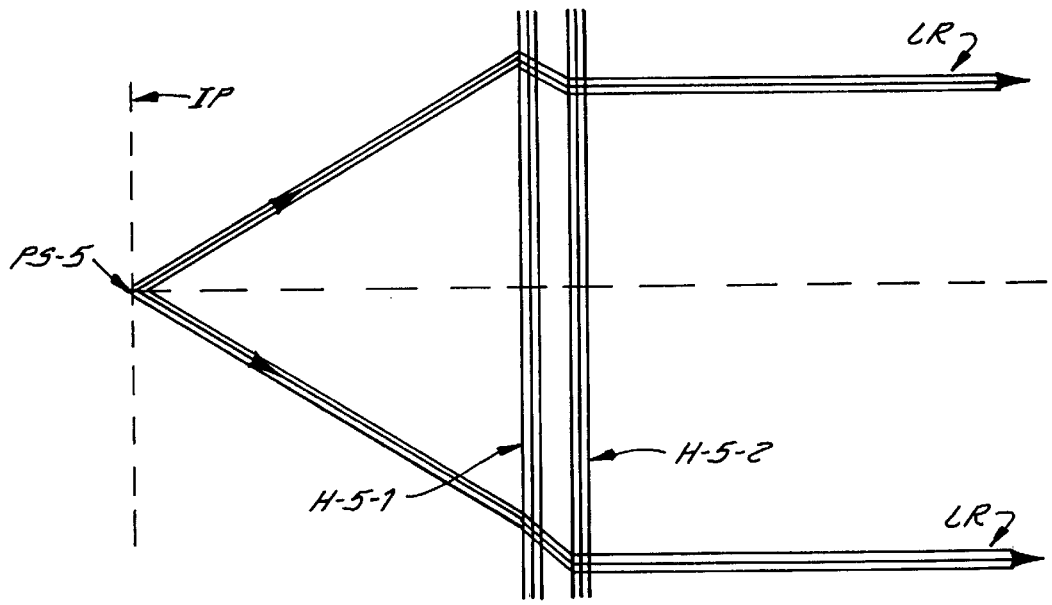
FIG. 5 is a side elevational schematic view, similar to FIG. 4, depicting a pair of spaced-apart multiplexed narrowband holographic optical elements that are illustrative of the present invention.

FIG. 5 depicts an approach in accord with the invention to correct the lateral dispersion, noted above (and depicted in FIG. 4) as well as the geometric aberration-related color blurring which results from utilizing state-of-the-art techniques.

The approach shown in FIG. 5 contemplates utilizing spaced-apart multiplexed narrowband sets of holographic optical elements ("H-5-1" and "H-5-2"). In particular, a first set of multiplexed narrowband holographic optical elements ("H-5-1") consists of separate holographic optical elements, one for each of the blue light ("BL"), green light ("GL") and red light ("RL") chromatic components which are mentioned hereinabove for purposes of illustrating the various principles of the present invention. The second set of holographic optical elements ("H-5-2"), similarly composed, is spaced from (and to the right of) the first set of holographic optical elements ("H-5-1").

In reference to the above, the term "narrowband" as used throughout this patent specification means that the photosensitive medium is recorded for each wavelength of light involved. Manufactured holograms are, of course, played-back with white light.

The optimal efficiency of a volume hologram depends on its index modulation and thickness, as well as on the geometry of the recording and re-construction processes. In order to preserve high optical efficiency, it is desirable to optimize the thickness and refractive modulation parameters. Diffraction efficiency of transmission holograms is determined by referring to references well-known to skilled artisans in this field. For a particular recording material, exposure-curve information must be either produced or referred to (as one would refer to data in a published reference), to determine a sequence of exposures in multiplexed recording of holograms, to achieve desired high efficiencies.

The high angular and wavelength selectivity of volume holograms makes it possible to record several holograms in the same medium e.g. commercial photoresist, if the medium is sufficiently thick, and to re-construct them separately if their Bragg angles are spaced-apart a sufficient distance. The maximum number of holograms which are multiplexable without appreciable crosstalk will, of course, depend upon the angular and wavelength selectivity of the volume holograms themselves.

Thus, in accordance with one of the principles of the present invention, one may either use, e.g. three, separately-recorded holograms (in a "stacked" fashion) or a multiplexed hologram, more particularly characterized as a multiplexed holographic film, to achieve the effects of no lateral dispersion and no color shift, noted above.

In reference to the above example, by using the same or substantially the same construction geometry for all three elements of each set of the above-described narrowband holographic optical elements ("H-5-1" and "H-5-2"), the above-noted geometric aberration-related color blurring will be compensated, while the lateral dispersion will be controlled by the bandwidth of each narrowband holographic element of the first and second sets ("H-5-1" and "H-5-2"), as is depicted by light rays ("LR"), with virtually no lateral dispersion, as shown in FIG. 5.

The result is collimated light that possesses no humanly-discernible geometric aberration-related color blurring or other undesirable lateral dispersion effects.

Figure 6:
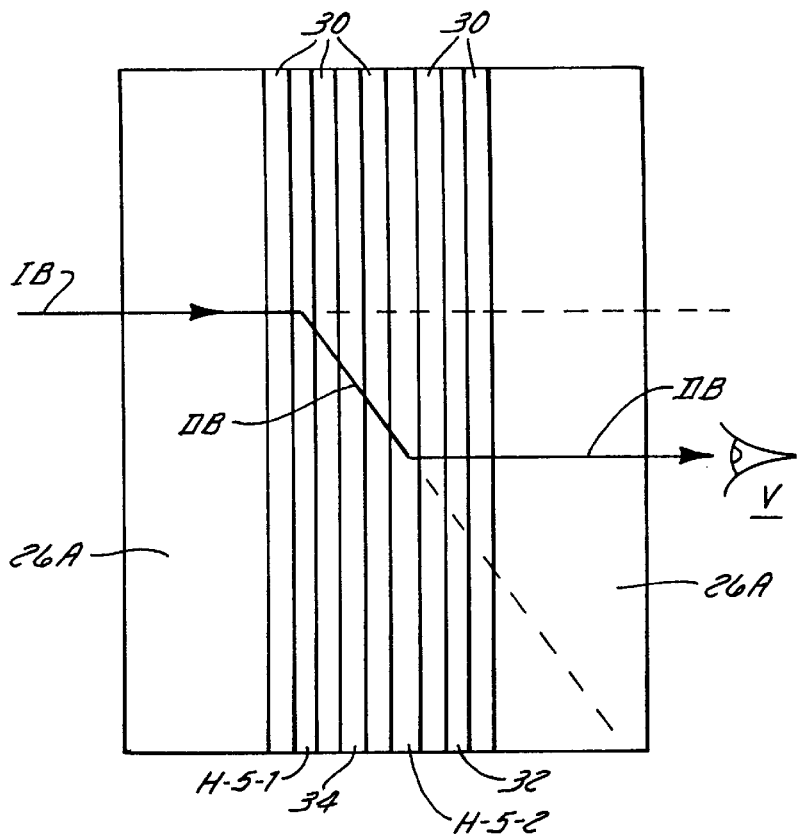
FIG. 6 is a schematic view, in section, depicting a method as well as associated details for eliminating a zero-order projected beam, in accordance with principles of the present invention.

FIG. 6 illustrates a method for eliminating a zero-order projected beam.

A white-light image beam ("IB") which includes the various color components (e.g., blue light, green light and red light) mentioned above is incident upon the illustrated composite that is characterized as including substrate 26A, as is shown in FIG. 6. The illustrated substrate 26A is a commercially-available optical-quality light-transmissive plastic material. Sandwiched between the plastic substrate 26A and the first set of narrowband holographic optical elements ("H-5-1") is a commercially-available pressure sensitive adhesive 30 that possesses suitable light-transmission and optical qualities for purposes of the present invention. The amount of adhesive 30 that is used is generally a matter of manufacturing efficiency. Such an amount is preferably the minimum amount effective for adhesively bonding together all adjacent layers of the illustrated composite (FIG. 6) including the substrate 26A as well as the first and second sets of holographic optical elements ("H-5-1" and "H-5-2") and micro louvered film layers 32 and 34 while allowing light to pass therethrough.

The light-transmissive optical composite (FIG. 6) includes another substrate layer 26A adjacent a viewer ("V"), which is compositionally and dimensionally identical to and located opposite the first-mentioned substrate layer 26A. Adjacent the viewer ("V"), another layer of the optical-quality adhesive 30 is used to adhesively bond a layer of a commercially-available micro louvered film 32 to the second-mentioned substrate layer 26A. The so-called "micro louvered" film 32, commercially-available from The Minnesota Mining and Manufacturing Company ("3M") of Saint Paul, Minn., is a film having microscopically-small louvers positioned at 0° relative to the incident beam ("IB") of light. An effective amount of the pressure sensitive optical-quality light-transmissive adhesive 30 is then similarly used to adhesively bond the second set of holographic optical elements ("H-5-2") to the layer of micro louvered film 32.

In operation, the micro louvered film 32 blocks the zero order light and only allows collimated light to exit the composite.

Another layer of the pressure sensitive optical adhesive 30 is used to adhesively bond the second set of holographic optical elements ("H-5-2") to a layer of yet another commercially-available micro louvered film 34. The second louvered film 34, also commercially-available from 3M, is a film having microscopically-small louvers, preferably oriented at between about 30° to about 45° relative to the incident beam ("IB") of light.

In operation, only light parallel to the orientation of both of the micro louvered films 32 and 34 will pass therethrough. Moreover, microscopic spacing of adjacent louvers of each micro louvered film 32 and 34 is selected for specific, well-known light wave lengths, which is also known to artisans familiar with this field.

The first set of holographic optical elements ("H-5-1") is adhesively-bonded, preferably to the second-mentioned layer of micro louvered film 34, by yet another layer of the above-described optical-quality pressure-sensitive adhesive 30.

In all instances relating to the manufacture of the illustrated composite, which is shown in FIG. 6, the amount of optical adhesive 30 used is typically a matter of manufacturing expediency, and is preferably a minimum effective amount required for adhesively bonding together the adjacent layers of a composite contemplated.

For figures herein, the first and second sets of holographic optical elements ("H-5-1" and "H-5-2") are each made of a polymeric material commercially-available by The E. I. Du Pont De Nemours & Company of Wilmington, Del.

In general, the multiplexing of several wavelengths in a single holographic optical element ("HOE") for the purpose of achieving uniform high Bragg efficiencies with acceptable crosstalk is not trivial, as skilled artisans in the field of the present invention will appreciate. Indeed, we have found that achieving such a result involves careful characterization of recording materials and optimization of the basic volume hologram characteristic parameters. This further includes careful consideration of the required design specifications. In that regard, the three basic characteristics of volume holograms—i.e., diffraction efficiency, angular selectivity and spectral selectivity—depend on material and geometrical parameters of desired holograms, e.g. refractive index modulation, thickness, wavelength and geometry.

In operation, a white-light incident beam ("IB") thus passes through substrate and adhesive layers 26A and 30 opposite the viewer ("V"), and is diffracted by the first set of holographic optical elements ("H-5-1"). The resultant diffracted beam ("DB") thereafter continues in a straight line until it is deflected by the second set of holographic elements ("H-5-2"), which change the direction of the diffracted beam ("DB") preferably back to a position that is parallel to its original path-of-travel, as is illustrated in FIG. 6. To the viewer ("V"), DB appears as white light, not chromatically or otherwise dispersed.

The dashed lines which appear to emanate within each of the first and second sets of holographic elements and which proceed to the right of FIG. 6 represent complete elimination of the zero order projected beam, which is achieved by the micro louvered layer 34.

The composite design of FIG. 6 thus illustrates three-color (e.g. red, green, blue) narrowband multiplexed dispersion-compensating film holograms 28 (shown in FIG. 3) which includes the micro louvered films 32 and 34 discussed above. Such holograms 28 (FIG. 3) effectively block-out substantially all of the transmitted zero order light.

In the composite (FIG. 6), adhesive layers 30 are as thin as possible. The composite is preferably manufactured by compressing the various layers together, using conventional presses designed for the materials involved. One object during the "pressing" step is to keep the various layers as parallel as possible. Thus, starting from either substrate layer 26A (left or right side), after the next layer is applied and pressed in a manner so that layers are as parallel as possible, an ultra violet ("UV") curing step is employed. After each subsequent layer is applied and then pressed to make the accumulating layers as parallel as possible, the UV-curing step is repeated.

To produce the film hologram 28 (FIG. 3), which is illustrative of the first and second set of holographic optical elements ("H-5-1" and "H-5-2"), via off-axis collimation to on-axis focusing of H-5-1 and via off-axis collimation to on-axis collimation of H-5-2, a red laser (Krypton, 647 nanometers), a green laser (Argon, 514 nanometers) and a blue laser beam (Argon, 457 nanometers) are preferably employed, as follows. To produce the first set of holographic optical elements H-5-1, light from the red laser is reflected by a mirror and light from the green and blue lasers is reflected by separate dichroic mirrors. All reflected light is passed to a beam combiner. A portion of the combined red, green and blue light from the beam combiner is passed through a first spatial filter. Light exiting the first spatial filter is passed to a first collimating mirror. Such light is reflected first from the first collimating mirror and subsequently from another mirror and thereafter passed to a hologram recording plate on which photo sensitive medium is disposed. The remainder of the combined light from the beam combiner is reflected by a pair of mirrors and thereafter passed through a second spatial filter. Light from the second spatial filter is next passed to the hologram recording plate on which the photosensitive medium is disposed. The hologram recording plate is mounted on a translation and rotation stage.

To produce the second set of holographic elements H-5-2, the red laser light is reflected from a mirror and the green and blue laser light is reflected by separate dichroic mirrors to a beam combiner. A portion of the combined red, green and blue light from the beam combiner is passed through the first spatial filter and subsequently reflected, as described above, and passed to the hologram recording plate on which the photo sensitive medium is disposed. The remainder of the combined light from the beam combiner is passed through a second spatial filter, which splits the beam in two. The resulting two beams are reflected first by a collimating mirror and next by a subsequent mirror and next passed to the hologram recording plate on which the photosensitive medium is disposed.

To produce the sets of holographic elements ("H-5-1" and "H-5-2") light diffusers were employed. While those skilled artisans of this will appreciate that circular, elliptical and other diffusers may be used, we prefer to use circular diffusers. In that regard, we further prefer to use circular diffusers having 30° angles. Moreover, as photo sensitive medium, we prefer to use a commercially-available, so-called "pan chromatic" silver halide film which is sensitive to three wavelengths and sold by Du Pont. In accordance with the above, we are thus able to record three different wavelengths to a single film.

Figure 7:
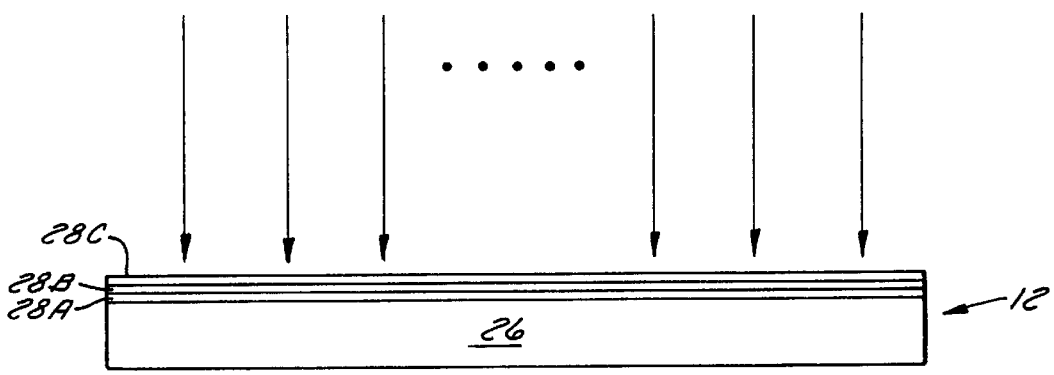
FIG. 7 is a schematic view of a stacked hologram illustrative of the invention.

The stacked hologram shown in FIG. 7 will now be described. The holographic diffuser screen 12 includes substrate 26 as well as separate narrowband film holograms 28A, 28B and 28C stacked thereon. Substrate 26 is an optical-quality light-transmissive commercially-available polyester, preferably about 4 millimeters thick.

For each hologram, a suitable thickness is selected. The film holograms 28A, 28B and 28 C preferably have a thickness of between about 25 to about 50 microns.

For red light, an effective amount of commercially-available "sensitizer" solution is used. About 1% to about 10%, preferably between about 1% to about 7%, by weight of a commercially-available ammonium dichromate solution is used for such a purpose.

A commercially-available silver halide is preferably applied, as e.g. a coating, at a thickness of between 5 microns to about 50 microns, and more preferably at a thickness of between 10 microns to about 20 microns, to produce each of the film holograms.

Spaced-apart reference beams containing the combined red, green and blue light components are used to expose photosensitive material, thus producing film holograms.

From the beams, exposure of the film holograms 28A, 28B and 28C is preferably between about 50 millijoules to about 400 millijoules, and more preferably is between about 100 millijoules and about 200 millijoules, per square centimeter of film surface.

Each exposed film layer is then processed in a known manner using an aqueous mixture of a commercially-available alcohol. The aqueous alcohol mixture is preferably at a temperature of between about 15° C. to about 30° C., more preferably between about 20° C. to about 23° C., and still more preferably at about 21° C. to about 22° C. For this purpose, an assortment of suitable alcohols are known to skilled artisans of this field. While various water/isopropyl alcohol mixtures may be employed, we prefer to use a varying "parts-by-weight" concentration of water/isopropyl alcohol, which we characterize as 75/25 followed by 50/50, next followed by 25/75, which is then followed by 10/90, all expressed in parts by weight, so that at the end of processing the "fixing" solution is 100% isopropyl alcohol. Further in this regard, each exposed film layer is developed or "fixed" by being held in an alcohol-containing processing vat for a period of between about 1 to about 3 minutes, for each such concentration noted above.

Summarizing the above, film 28A is applied, e.g. as a coating, to substrate 26, is then exposed for a predetermined period of time to reference beams of light, and next held in a developing solution, again for a predetermined period of time, to "fix" images in film 28A. Then film 28B is applied, e.g. as a coating, onto now "fixed" film 28A, is then exposed for a predetermined period of time to reference beams of light, and next held in a developing solution, again for a predetermined time period, to "fix" images in film 28B. Finally, film 28C is applied, e.g. as a coating, onto now "fixed" film 28B, is then exposed for a predetermined time period to reference beams of light, and next held in a developing solution, again for a predetermined time period, to "fix" images in film 28C.

An additional substrate layer (not shown) similar to or identical to the illustrated substrate layer 26 may be adhesively bonded to the uppermost film layer 28C if desired.

A so-called "contact copy" feature of the present invention will now be discussed.

FIG. 8A is a schematic side elevational view, illustrating a first step of a method for copying holographic information from a holographic master such as the holographic optical element 12A onto a potential holographic submaster such as the holographic optical element 12B. Holographic master 12A comprises a layer of conventional glass substrate as well as a "fixed" holographic film (neither of which is separately shown) applied thereto. The "fixed" holographic film was made from the commercially-available polymerizable photosensitive material, in accordance with principles set forth herein.

Potential holographic submaster 12B also comprises a layer of conventional glass substrate onto which is thinly applied an unexposed layer of the commercially-available photosensitive polymer, mentioned above. Between the holographic master 12A and the potential holographic submaster 12B, and in contact with each, is applied a thin film of an index-matching material 36. If a solid, it is contemplated that a flexible film such as so-called "static-cling" vinyl would be a suitable index-matching material 36. If a liquid, it is contemplated that an assortment of various "Isopar" fluids commercially-available from the Exxon Mobil Corporation of Irving, Tex. and Florham Park, N.J. would be suitable.

The potential holographic submaster 12B is then exposed to coherent light from a coherent-light source such as the illustrated laser light passing through the holographic master 12A and index-matching material 36 (FIG. 8A) for an amount of time sufficient to expose the photosensitive material on the submaster 12B and thereby make a "copy" of the master holographic element 12A.

FIG. 8B shows a subsequent step of the method wherein a potential submaster hologram 12C, exposed to laser light, begins polymerizing as follows. Laser exposure initiates photo polymerization of monomer. Photons absorbed in the exposed regions produce free radicals to polymerize monomer. As monomer is depleted, concentration-density driving forces cause monomer to diffuse from unexposed regions into exposed regions. Such a polymer-diffusion process produces exposed as well as unexposed regions. Index modulation is a result of the index differences between these regions.

After a satisfactory copy of the master hologram 12A is made, the index-matching material 36 and master 12A are removed. The exposed submaster copy is then exposed to ultra violet light ("UV") for an amount of time that is effective for "fixing" the exposure of the submaster holographic element, thereby producing the exposed and "fixed" submaster holographic copy 12D, shown in FIG. 8C.

The mosaic master array illustrated by FIGS. 9A and 9B will now be discussed. FIG. 9B depicts a 3 by 3 mosaic array of subholographic optical elements which are identified as $HOE_1$, $HOE_2$, $HOE_3$, $HOE_4$, $HOE_5$, $HOE_6$, $HOL_7$, $HOE_8$ and $HOE_9$. The geometries of the nine subholograms are different. However, from the above-described procedures for both off-axis collimation to on-axis-focusing and for off-axis collimation to on-axis collimation, those skilled artisans in the field to will appreciate that only three sets of recording geometries are required to record all nine subholograms. For example, by using commercially-available heavy-duty precision rotation and translation stages, one for the recording plate holder and the other for the plane mirror, those skilled artisans in this field of technology will readily appreciate that the beam forming can be controlled simply by computer controlled movement of these stages.

Using such a recording device, multiplexed three-color master subhologram sets ("H-5-1" and "H-5-2") such as are shown in FIG. 5 can be recorded using three laser beams at, e.g., 457 nanometers for blue, 514 nanometers for green, from two separate Argon lasers and 647 nanometers for red from a Krypton laser, operating simultaneously.

Use of identical geometries and wavelengths to record and re-construct holograms will virtually eliminate chromatic aberration and wavelength-dependent image distortion.

Finally, the mosaic principles illustrated by FIGS. 9A and 9B can be applied to the process set forth in FIGS. 8A, 8B and 8C to produce mosaic array copies.

For purposes of training pilots, navigators and other aircraft personnel, e.g., the collimating screen simulator of the present invention presents images that appear very realistic, not simulated, a feature which those skilled artisans in the field of the present invention can readily appreciate.

What has been illustrated and described herein is a collimating screen simulator. At this juncture, it is important to bear in mind, since the collimating screen simulator of the invention has been illustrated and described with reference to preferred embodiments, that the invention is not to be limited to these embodiments.

In particular, as those skilled in the field of the invention can appreciate, functional alternatives will become apparent after reviewing this patent specification. As a result, all such functional equivalents, alternatives and/or modifications are to be considered as forming a part of the present invention insofar as they fall within the spirit and scope of the appended claims.

We claim:

1. A collimating display screen comprising:

at least one optically light-transmissive substrate;

a first multiplexed multi-wavelength holographic film layer adjacent to said substrate;

a first micro louvered film layer adjacent to said first holographic film layer;

a second multiplexed multi-wavelength holographic film layer adjacent to said first micro louvered film layer; and a second micro louvered film layer adjacent to said second holographic film layer;

said second holographic film layer being configured for collimating light passing through said substrate.

2. The collimating display screen of claim 1, wherein the substrate is plastic or glass.

3. The collimating display screen of claim 2, wherein the plastic is polycarbonate.

4. The collimating display screen of claim 2, wherein the substrate is about 1 millimeter to about 6 millimeters thick.

5. The collimating display screen of claim 2, wherein the substrate is about 2 millimeters to about 5 millimeters thick.

6. The collimating display screen of claim 2, wherein the substrate is about 3 millimeters to about 4 millimeters thick.

7. The collimating display screen of claim 1, wherein each said holographic film layer has a thickness that ranges from between about 5 microns and about 50 microns.

8. The collimating display screen of claim 1, wherein each said holographic film layer has a thickness that ranges from between about 10 microns and about 40 microns.

9. The collimating display screen of claim 1, wherein each said holographic film layer has a thickness that ranges from between about 15 microns and about 35 microns.

10. The collimating display screen of claim 1, wherein the substrate has an external surface and receives on said external surface an incident light beam, wherein the first micro louvered film layer has micro louvers oriented at between about 30° to about 45° relative to the incident beam for causing the incident beam to be deflected thereby to produce a deflected beam, and wherein the second micro louvered film layer has micro louvers that are positioned at 0° relative to the deflected beam.

11. The collimating display screen of claim 1, wherein the composite further includes an optically light-transmissive adhesive between said adjacent layers for adhesively bonding together said adjacent layers while allowing light to pass therethrough.

12. The collimating display screen of claim 1, wherein each said holographic film layer comprises a plurality of individual holograph films, each such film having a respective narrow band holograph configured for a respective selected wavelength of light.

13. The collimating display screen of claim 1, wherein each said holographic film layer comprises a holographic film having a plurality of respective narrowband holographs configured for a plurality of selected distinct wavelengths of light.

* * * * *